United States Patent
Pesta et al.

[11] Patent Number: 6,142,561
[45] Date of Patent: Nov. 7, 2000

[54] REMOVABLE SEATING UNIT HAVING A PIVOTING SEATBACK AND A COMBINATION HANDLE AND ITEM SUPPORTING DEVICE

[75] Inventors: Christopher J. Pesta, Sterling Heights; Murali M. Govindarajalu, Southfield; Troy M. Cornell, Plymouth, all of Mich.

[73] Assignee: DaimlerChrysler Corporation, Auburn Hills, Mich.

[21] Appl. No.: 09/289,167

[22] Filed: Apr. 9, 1999

[51] Int. Cl.$^7$ .................................................. A47C 7/62
[52] U.S. Cl. ............................. 297/188.04; 297/188.06; 297/188.2; 297/188.01; 297/452.18; 248/339; 248/304
[58] Field of Search ..................... 297/188.04, 188.06, 297/188.2, 188.01, 452.18, 452.2; 248/339, 304; 108/44

[56] References Cited

U.S. PATENT DOCUMENTS

| | | | |
|---|---|---|---|
| D. 177,922 | 6/1956 | Orsborn | 297/188.04 X |
| 1,665,352 | 4/1928 | Gibbs | 297/452.18 |
| 2,797,741 | 7/1957 | Hodges, Jr. et al. | 297/188.04 X |
| 4,519,650 | 5/1985 | Terada et al. | 297/452.18 |
| 4,595,238 | 6/1986 | Goldner | 297/452.18 |
| 4,695,097 | 9/1987 | Muraishi | 297/452.18 |
| 5,292,174 | 3/1994 | Ohnuma | 297/188.06 X |
| 5,863,092 | 1/1999 | Kifer | 297/188.04 |
| 5,961,181 | 10/1999 | Salehi et al. | 297/188.04 |

*Primary Examiner*—Peter M. Cuomo
*Assistant Examiner*—Rodney B. White
*Attorney, Agent, or Firm*—Roland A. Fuller, III

[57] ABSTRACT

A seatback having a frame formed in a generally U-shape from a tubular material and a plate coupled between the two legs of the U, a back panel, an outer fabric and an attachment device having a plurality of mounting hooks, a handle, a pair of mounting bosses and a pair of mounting legs. The mounting legs are inserted through slots formed in the outer fabric, back panel and plate. Once the mounting legs are fully inserted into the plate, a portion of each of the mounting legs engages the front side of the plate. Threaded fasteners are placed through the mounting bosses and threadably engage clinch nuts that are coupled to the plate. When a the removable seating unit is lifted by the handle, the force associated with lifting the seating unit is transferred directly to the seatback frame through the threaded fasteners and mounting legs. Consequently, the present invention provides an easily manufactured and assembled removable seating unit having a handle and an item supporting device which is robust in design yet cost efficient.

26 Claims, 4 Drawing Sheets

REMOVABLE SEATING UNIT HAVING A PIVOTING SEATBACK AND A COMBINATION HANDLE AND ITEM SUPPORTING DEVICE

BACKGROUND OF THE INVENTION

1. Technical Field

The present invention relates generally to seating units and functional interior automotive trim and more particularly to a seatback frame and a combination seat handle and item supporting device for attachment device to the back of a vehicle seating unit.

2. Discussion

Several types of item supporting devices are disclosed in commonly assigned U.S. Pat. No. 5,415,457, which is hereby incorporated by reference as if fully set forth herein. While the unit described in U.S. Pat. No. 5,415,457 has provided certain improvements in the pertinent art, it is susceptible nonetheless to improvement.

For example, the prior art item supporting devices are frequently placed on the backs of several seating units within a vehicle, several of which may be removable to allow the vehicle operator to configure the vehicle to carry additional cargo. As these removable seating units tend to be both heavy and bulky, vehicle operators frequently find it difficult to remove and replace them. To aid in their removal and replacement, it is therefore desirable to include a handle on the back of the removable seating unit in addition to the item supporting device. However, including a separate handle would have several significant drawbacks, including the addition of at least one more part number, additional labor to fabricate and install the handle, concerns as to the placement of the handle relative to the item supporting device. Therefore, there remains a need in the art for an item supporting device with an integral handle which can be used to reposition a removable seating unit. There also remains a need in the art for a removable seating unit with a pivoting seatback which has sufficient strength to allow the seating unit to be lifted by a handle attached to the rear side of the seatback.

SUMMARY OF THE INVENTION

It is a general object of the present invention to provide a item supporting device with an integral handle which may be coupled to the seat back of a removable seating unit to assist in the removal and repositioning of the seating unit.

It is another object to provide a seating unit for use with a combination handle and item supporting attachment device which has sufficient strength and support to allow the seating unit to be lifted from the handle and repositioned or removed as desired by the vehicle occupants.

The present invention includes a seatback having frame formed in a generally U-shape from a tubular material and a plate coupled between the two legs of the U, a back panel, an outer fabric and an attachment device having a plurality of mounting hooks, a handle, a pair of mounting bosses and a pair of mounting legs. The mounting legs are inserted through slots formed in the outer fabric, back panel and plate. Once the mounting legs are fully inserted into the plate, a portion of each of the mounting legs engages the front side of the plate. Threaded fasteners are placed through the mounting bosses and threadably engage clinch nuts that are coupled to the plate. When the removable seating unit is lifted by the handle, the force associated with lifting the seating unit is transferred directly to the seatback frame through the threaded fasteners and mounting legs. Consequently, the present invention provides an easily manufactured and assembled removable seating unit having a handle and an item-supporting device which is robust in design yet cost efficient.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
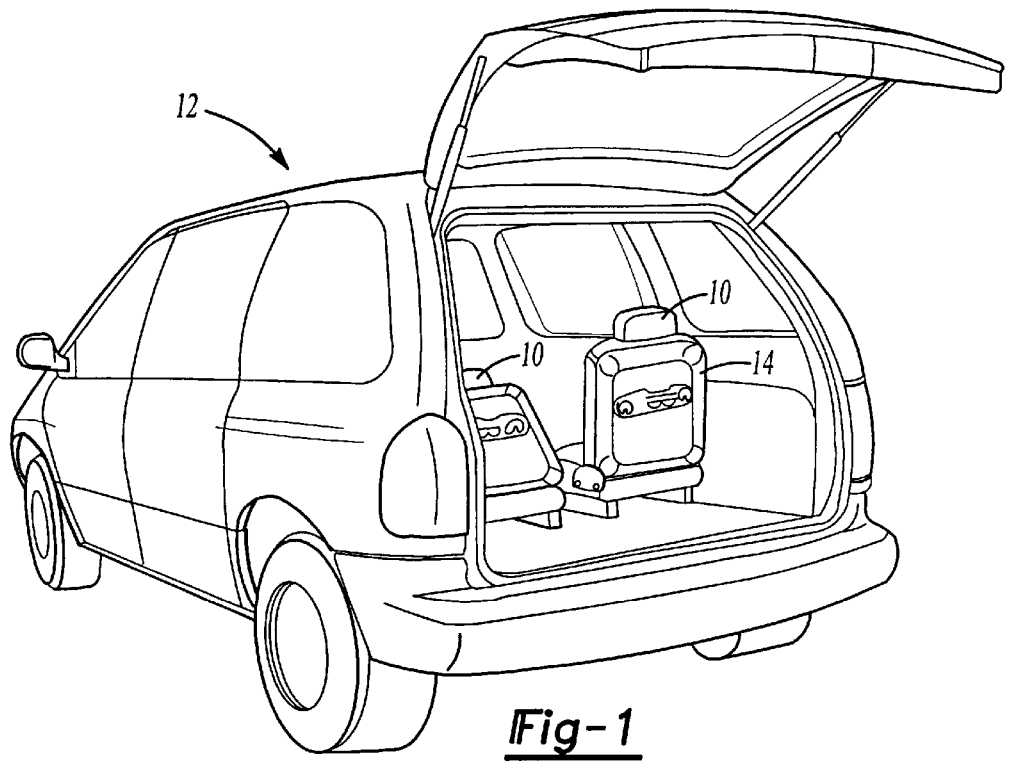
FIG. 1 is a partial perspective view of the interior of a vehicle showing a pair of removable seating units which employ the combination handle and attachment device according to a preferred embodiment of the present invention.
Figure 2:
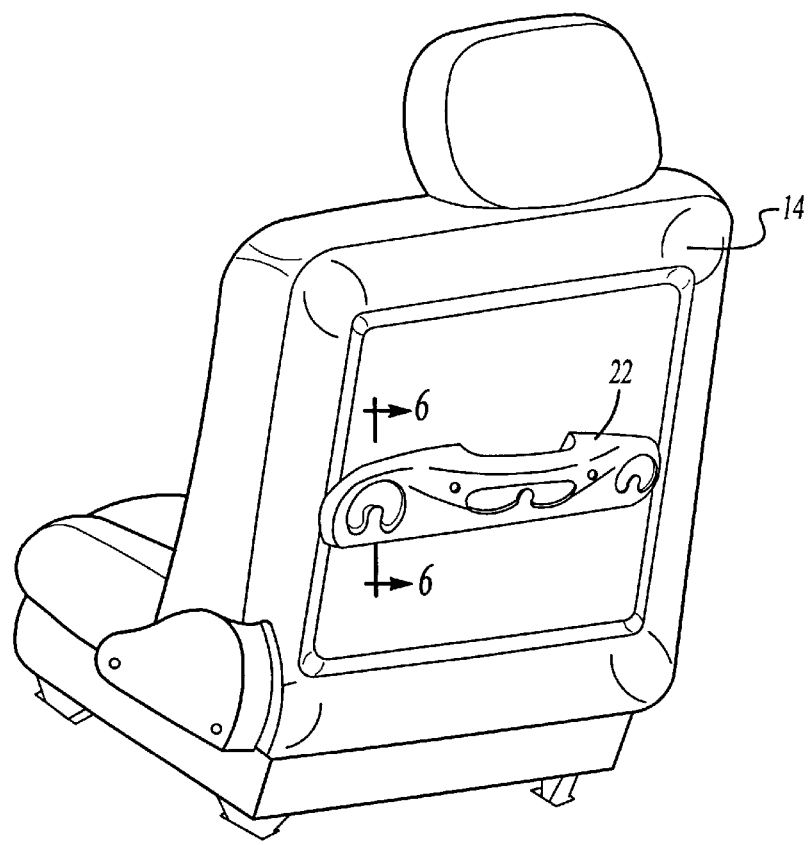
FIG. 2 is a rear perspective view of one of the seating units shown in FIG. 1.
Figure 3:
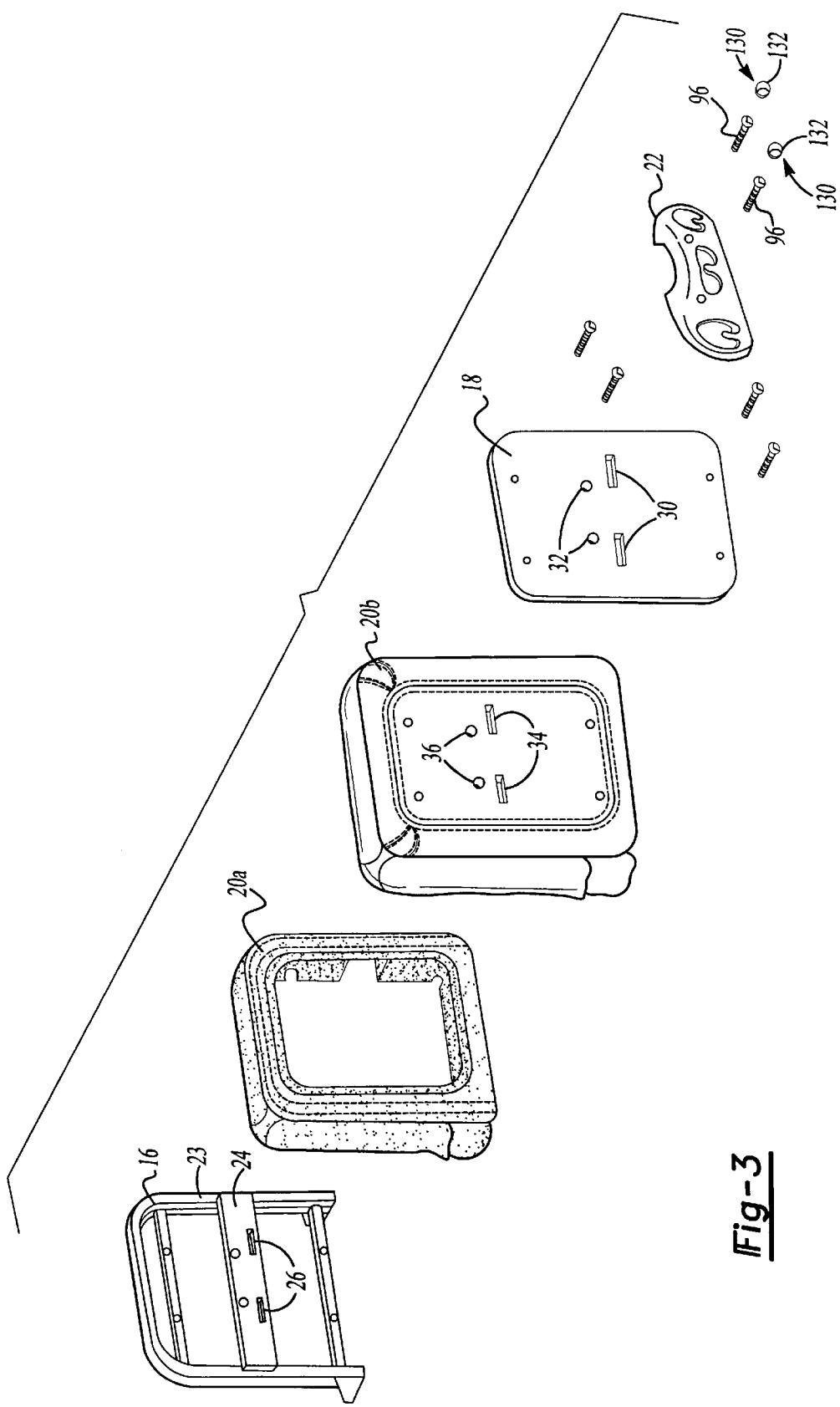
FIG. 3 is an exploded perspective view of the seating unit shown in FIG. 2.

Referring to FIG. 1 of the drawings, a pair of seating units 10 are shown operatively associated with a vehicle 12. Seating units 10 are removable and include a pivoting seatback 14 which is operable between a substantially vertical raised position and a substantially horizontal lowered position. With additional reference to FIGS. 2, 3 and 6 of the drawings, seating units 10 are also shown to include a seatback frame 16, a rigid carpeted back panel 18, a cushion material 20a, an exterior fabric 20b and the combination handle and item supporting attachment device of present invention generally indicated by reference numeral 22.

The perimeter of seatback frame 16 is formed from a continuous length of steel tubing 23. A plate 24 is welded between the sides of seatback frame 16 to provide increased strength and rigidity. Plate 24 is formed from an appropriate material such as SAE 1008 steel and has a thickness of approximately 1.5 mm (0.060 inch). In the preferred embodiment, plate 24 includes a pair of slotted apertures 26 and a pair of self-tapping clinch nuts 28.

Back panel 18 is approximately 6 mm thick and is coupled to seatback frame 16 in a conventional manner. Back panel 18 includes a pair of slotted apertures 30 and a pair of circular apertures 32 which align with slotted apertures 26 and clinch nuts 28, respectively, when back panel 18 is coupled to seatback frame 16.

Exterior fabric 20b is coupled to seatback frame 16 in a conventional manner and serves to improve the appearance of seatback 14. Exterior fabric 20b also includes a pair of slotted apertures 34 and a pair of circular apertures 36 which align with slotted apertures 26 and clinch nuts 28, respectively.

Figure 4:
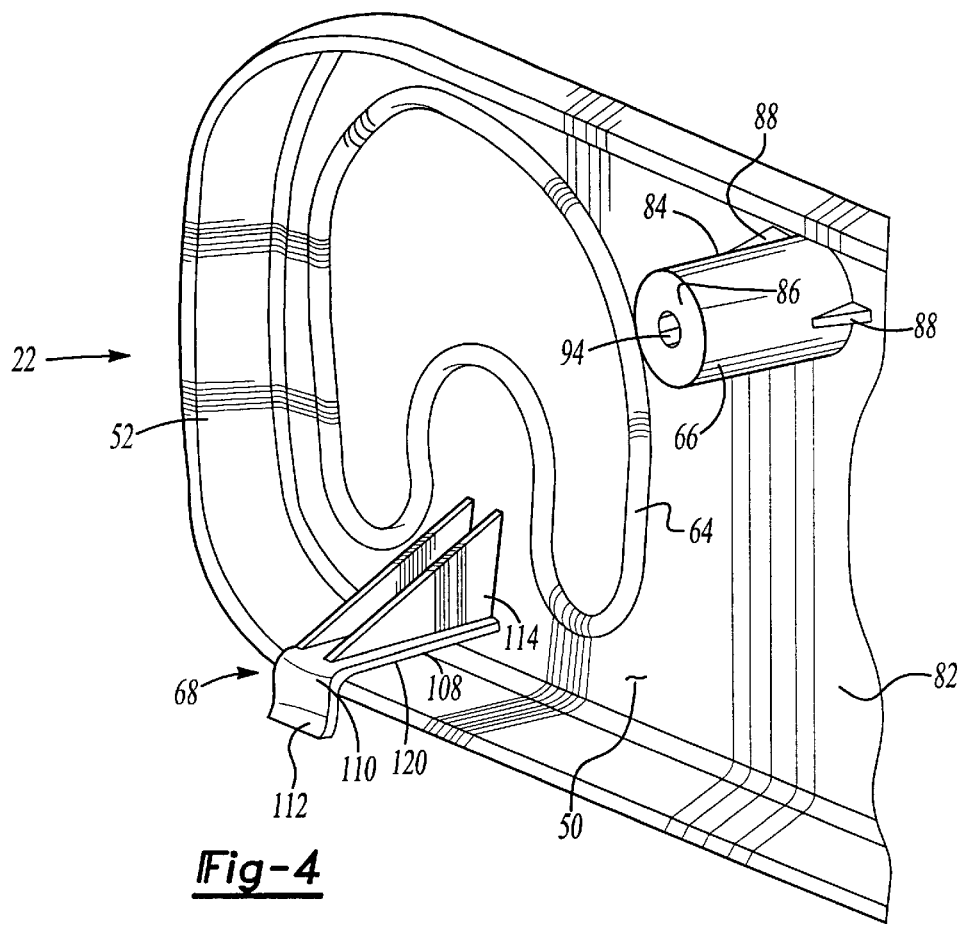
FIG. 4 is a perspective view of the back of the combination handle and attachment device of the present invention.
Figure 5:
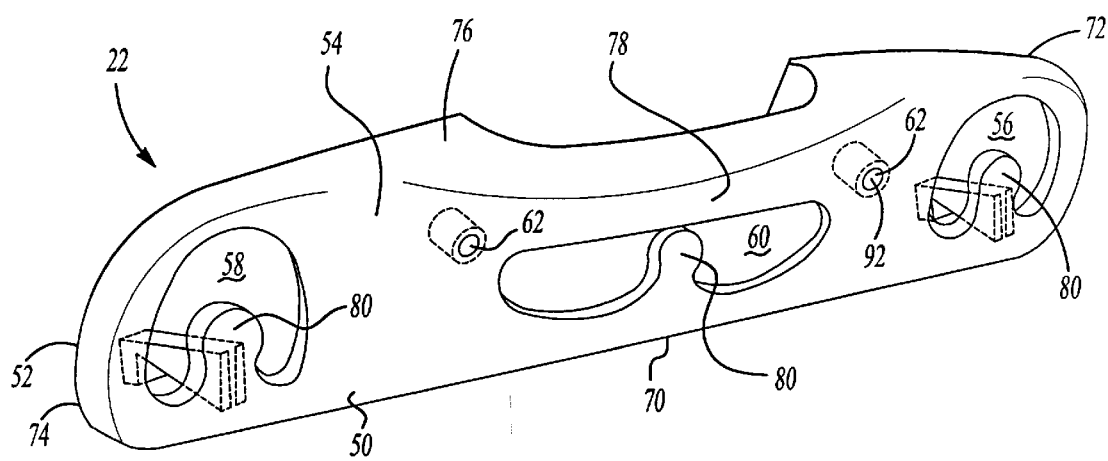
FIG. 5 is a perspective view of the front of the combination handle and attachment device of the present invention.
Figure 6:
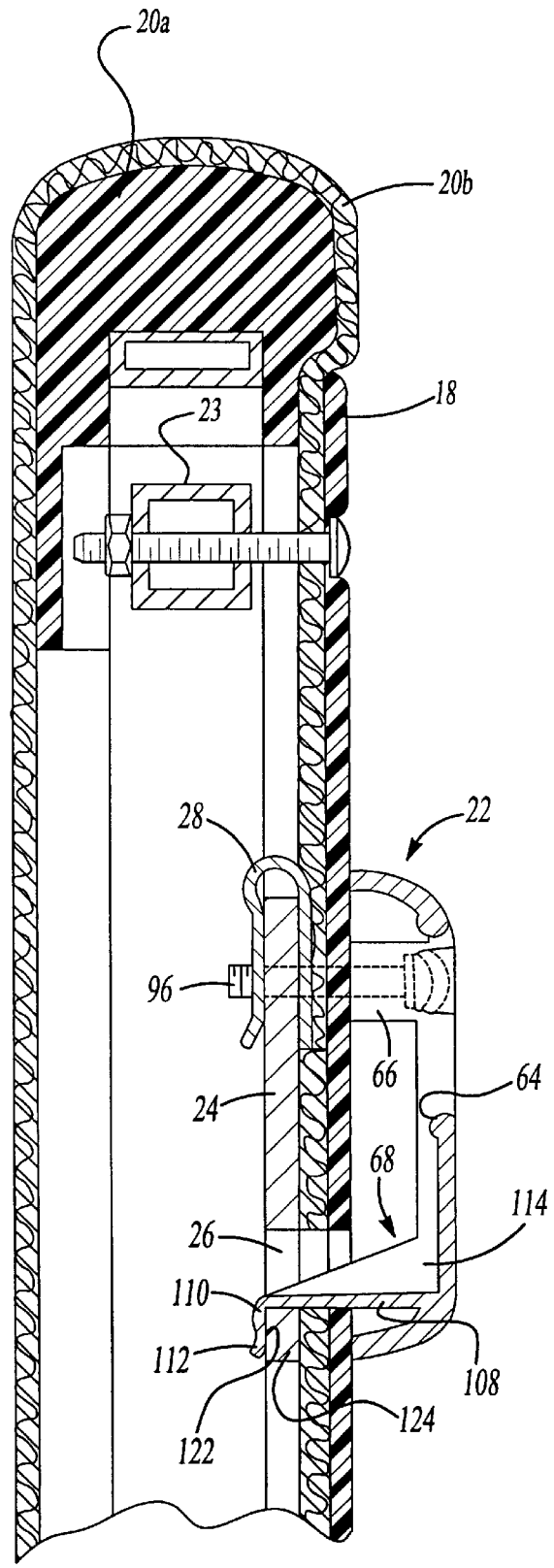
FIG. 6 is a cross-sectional view of the seatback of the seating unit taken along line 6—6 in FIG. 2.

Attachment device 22 is preferably unitarily formed from a material such as polypropylene. With reference to FIGS. 4, 5 and 6, attachment device 22 is shown to include a substantially flat base portion 50, a perimeter flange 52, a tapered transition area 54, first and second U-shaped apertures 56 and 58, respectively, a central aperture 60, a plurality of mounting apertures 62, a plurality of reinforcing beads 64, a pair of mounting bosses 66 and a pair of mounting legs 68. Perimeter flange 52 is perpendicular to and extends away from base portion 50. The length of perimeter flange 52 is fairly uniform along the bottom edge 70 and sides 72, 74 of attachment device 22, but becomes substantially larger along the top edge 76. Tapered transition area 54 couples top edge 76 to base portion 50. Central aperture 60 is formed in base portion 50 and extends through tapered transition area 54. Central aperture 60 also extends through a portion of top edge 76 to form a handle 78. Central aperture 60, as well as first and second U-shaped apertures 56 and 58, each form a mounting hook 80 proximate bottom edge 70.

With specific reference to FIG. 4, first U-shaped aperture 56 is shown to be bounded on the rear side 82 of base portion 50 by reinforcing bead 64. Reinforcing bead 64 provides additional strength and rigidity to corresponding mounting hook 80. The height of reinforcing bead 64 may be varied to allow mounting hook 80 to achieve a desired strength. The reinforcing beads 64 bounding second U-shaped aperture 58 and central aperture 60 on rear side 82 are constructed in a similar manner and as such, will not be discussed in detail.

Mounting bosses 66 extend from rear side 82 and include a frustro-conically shaped sidewall 84, an end cap 86, a plurality of gussets 88. Mounting aperture 62 extends through mounting boss 66 and includes first and second portions 92 and 94, respectively. First portion 92 is sized to receive a fastener 96 which secures attachment 22 device to seatback frame 16. Second portion 94 is smaller in diameter than first portion 92 and is sized to slidingly receive the body 98 of fastener 96. Gussets 88 provide additional strength and rigidity to sidewall 84.

Each mounting leg 68 includes first, second, and third leg portions 108, 110 and 112, respectively, and gussets 114. First leg portion 108 is fixedly coupled to rear side 82 and extends in a generally perpendicular direction away from base portion 50. Second leg portion 110 is fixedly coupled to the opposite end of first leg portion 108 and generally extends in a generally perpendicular direction toward bottom edge 70. Third leg portion 112 is coupled to a distal end of second leg portion 110 and depends away from base portion 50 at a slight angle. Third leg portion 112 extends toward bottom edge 70 and away from rear side 82 and is included to facilitate the efficient assembly of attachment device 22 to seatback 14. Gussets 114 are included to strengthen their corresponding mounting leg 60, as well as the mounting hook 80 to which they are connected. Mounting apertures 62 and mounting legs 68 are positioned to align with clinch nuts 28 and slotted apertures 26 in seatback frame 16.

In assembling attachment device 22 to seatback 14, attachment device 22 is positioned such that third leg portions 112 are aligned with their corresponding slotted aperture 26. The configuration of third leg portions 112 permits an assembly technician to place bottom edge 70 against back panel 18 and roll attachment device 72 upward to engage third leg portions 112 into their respective slotted apertures 26. The configuration of third leg portions 112 also permits the lower edge 120 of third leg portion 112 to be inserted through back panel 18 and plate 24 without impediment. Attachment device 22 is rolled upward and pushed into seatback 14 to fully engage mounting legs 68 into slotted apertures 26 such that the front side 122 of second leg portion 110 abuts the rear side 124 of plate 24. Fasteners 96 are placed into fastener apertures 90 and rotated to threadably engage clinch nuts 28, thus fixedly securing attachment device 22 to seatback 14. Plugs 130 may then be installed to fastener aperture 90 to improve the visual appearance of attachment device 22. Each plug 130 includes a body portion 132 which is sized to provide a light press fit with first portion 92.

As shown in FIG. 1, attachment device 22 is positioned along seatback 14 such that mounting hooks 80 provide support to packages and cargo, such as plastic grocery bags 130. Handle 78 is positioned along seatback 14 to permit a rear seated passenger to comfortably reposition seatback 14 from a lowered position to a raised position. Handle 78 also provides a convenient and ergonomic gripping point for seating unit 10 which is useful in positioning seating unit 10 within vehicle 12 or removing seating unit 10.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments following within the description of the appended claims.

What is claimed is:

1. A combination handle and item supporting device comprising:
    a base portion having an aperture that extends through the base portion, the base portion being substantially flat and adapted to be coupled to a seatback of a vehicle seat;
    at least one mounting hook formed in said aperture; and
    a handle coupled to said base portion.

2. The combination handle and item supporting device of claim 1 wherein the base portion and the handle are unitarily formed.

3. The combination handle and item supporting device of claim 2 wherein said aperture extends through said base portion to form said handle.

4. The combination handle and item supporting device of claim 1 further comprising a generally L-shaped mounting leg having a first portion coupled to said base portion and extending rearward of said base portion in a substantially perpendicular direction and a second portion coupled to a distal end of said first portion, said second portion extending in a substantially perpendicular direction to said first portion.

5. The combination handle and item supporting device of claim 4 wherein said generally L-shaped mounting leg includes a third portion coupled to a distal end of said second portion, said third portion extending away from said second portion and said base portion.

6. The combination handle and item supporting device of claim 4 further comprising a gusset coupled to said first portion and said base portion.

7. The combination handle and item supporting device of claim 1 further including a mounting boss coupled to said base portion, said mounting boss adapted for receiving a threaded fastener to securely mount said device.

8. A combination handle and item supporting device comprising:
- a base portion having a plurality of apertures, one of said apertures being a central aperture;
- a perimeter flange coupled to said base portion and extending perpendicularly rearward therefrom;
- at least one mounting hook formed in said plurality of apertures;
- a pair of generally L-shaped mounting legs, each mounting leg having a first portion coupled to said base portion and extending rearward therefrom in a substantially perpendicular direction and a second portion coupled to a distal end of said first portion, said second portion extending in a substantially perpendicular direction to said first portion; and
- a handle coupled to said base portion.

9. The combination handle and item supporting device of claim 8 wherein the length of said perimeter flange along a top edge of said device is substantially larger than the length of said perimeter flange along a bottom edge of said device and said central aperture extends through a portion of said base portion and a portion of said upper edge to form said handle.

10. The combination handle and item supporting device of claim 8 wherein said mounting leg further includes a third portion coupled to a distal end of said second portion, said third portion extending away from said second portion and depending away from said base portion.

11. The combination handle and item supporting device of claim 8 further including a reinforcing bead formed proximate said plurality of apertures.

12. The combination handle and item supporting device of claim 8 further including a gusset coupled to said first portion and said base portion.

13. The combination handle and item supporting device of claim 8 wherein said device is unitarily formed from a polypropylene.

14. The combination handle and item supporting device of claim 8 further including a mounting boss coupled to said base portion, said mounting boss adapted for receiving a threaded fastener to securely mount said device.

15. A combination handle and item supporting device comprising:
- a base portion having a plurality of apertures, one of said apertures being a central aperture;
- a perimeter flange coupled to said base portion and extending perpendicularly rearward therefrom, the length of said perimeter flange along a top edge of said device being substantially larger than the length of said perimeter flange along a bottom edge of said device;
- at least one mounting hook formed in said plurality of apertures;
- a reinforcing bead formed proximate said plurality of apertures;
- a generally L-shaped mounting leg having a first portion coupled to said base portion and extending rearward therefrom in a substantially perpendicular direction, a second portion coupled to a distal end of said first portion, said second portion extending in a substantially perpendicular direction to said first portion and a third portion coupled to a distal end of said second portion, said third portion extending away from said second portion and depending away from said base portion;
- a gusset coupled to said first portion and said base portion; and
- a mounting boss coupled to said base portion;

wherein said central aperture extends through a portion of said base portion and a portion of said upper edge to form a handle and said mounting boss is adapted for receiving a threaded fastener to securely mount said device.

16. A seating unit for a vehicle comprising:
- a seatback having a seatback frame with a generally U-shaped perimeter formed from a tubular material, said perimeter including first and second legs, and a plate coupled to said perimeter and extending between said first and second legs, said plate including at least one slotted aperture; and
- a combination handle and item supporting device having a base portion with an aperture, a mounting hook formed in said aperture, a generally L-shaped mounting leg having a first portion coupled to said base portion and extending rearward of said base portion in a substantially perpendicular direction and a second portion coupled to a distal end of said first portion, said second portion extending in a substantially perpendicular direction to said first portion, and a handle coupled to said base portion;

wherein said device is coupled to said seatback such that said first portion extends through said slotted aperture and said second portion abuts a rear side of said plate.

17. The seating unit for a vehicle of claim 16 wherein said base portion and said handle are unitarily formed.

18. The seating unit for a vehicle of claim 17 wherein said aperture in said base portion extends through said base portion to form said handle.

19. The seating unit for a vehicle of claim 17 wherein said generally L-shaped mounting leg includes a third portion coupled to a distal end of said second portion, said third portion extending away from said second portion and depending away from said base portion.

20. The seating unit for a vehicle of claim 17 further including a reinforcing bead formed proximate said aperture.

21. The seating unit for a vehicle of claim 17 further including a gusset coupled to said first portion and said base portion.

22. The seating unit for a vehicle of claim 17 wherein said device is unitarily formed from a polypropylene.

23. The seating unit for a vehicle of claim 17 further including a mounting boss coupled to said base portion, said mounting boss receiving a threaded fastener to securely mount said device to said seatback frame.

24. The seating unit for a vehicle of claim 23 wherein said threaded fastener engages a clinch nut coupled to said seatback frame.

25. The seating unit for a vehicle of claim 17 wherein said plate is formed from approximately 1.5 mm thick sheet steel.

26. A seating unit for a vehicle comprising:
- a seatback having a seatback frame with a generally U-shaped perimeter formed from a tubular material, said perimeter including first and second legs, and a plate coupled to said perimeter and extending between said first and second legs, said plate including at least one slotted aperture;
- a combination handle and item supporting device coupled to said seatback, said device having a base portion with a plurality of apertures, one of said apertures being a central aperture, a perimeter flange coupled to said base portion and extending perpendicularly rearward therefrom, the length of said perimeter flange along a top edge of said device being substantially larger than the length of said perimeter flange along a bottom edge of said device, at least one mounting hook formed in said plurality of apertures, a reinforcing bead formed proximate said plurality of apertures, a generally L-shaped mounting leg having a first portion coupled to said base portion and extending rearward of said base portion in a substantially perpendicular direction, a second portion coupled to a distal end of said first portion, said second portion extending in a substantially perpendicular direction to said first portion and a third portion coupled to a distal end of said second portion, said third portion extending away from said second portion and depending away from said base portion, a gusset coupled to said first portion and one of said base portion and said transition area, and a mounting boss coupled to said base portion; and a threaded fastener;

wherein said central aperture extends through a portion of said base portion and a portion of said upper edge to form a handle, said first portion extends through said slotted aperture such that said second portion abuts a rear side of said plate and said threaded fastener extending through said mounting boss and threadably engaging a clinch nut fixed to said seatback frame.

* * * * *